US00RE37472B1

(19) United States
(12) Reissued Patent
Baker

(10) Patent Number: US RE37,472 E
(45) Date of Reissued Patent: Dec. 18, 2001

(54) DRAG CONVEYOR SYSTEM FOR PARTICULATE MATERIAL

(76) Inventor: Jon F. Baker, 6500 Pasco Montra Rd., Sidney, OH (US) 45365

(21) Appl. No.: 09/511,426

(22) Filed: Feb. 23, 2000

Related U.S. Patent Documents

Reissue of:
(64) Patent No.: 5,947,261
Issued: Sep. 7, 1999
Appl. No.: 08/905,012
Filed: Aug. 11, 1997

(51) Int. Cl.[7] ..... B65G 19/06
(52) U.S. Cl. ..... 198/727; 198/729; 198/734
(58) Field of Search ..... 198/716, 727, 198/729, 733, 734, 735.5

(56) References Cited

U.S. PATENT DOCUMENTS

| | | | | |
|---|---|---|---|---|
| 1,449,208 | * | 3/1923 | Wood | 198/727 |
| 3,111,216 | * | 11/1963 | Geberin | 198/727 |
| 3,167,173 | * | 1/1965 | Sackett | 198/727 |
| 3,468,410 | * | 9/1969 | Kelley | 198/727 |
| 4,027,770 | * | 6/1977 | Collier | 198/733 |
| 5,170,882 | * | 12/1992 | Tekathen et al. | 198/729 |
| 5,174,433 | * | 12/1992 | Moser | 198/734 |
| 5,605,220 | * | 2/1997 | Krohm | 198/727 |
| 5,947,261 | * | 9/1999 | Baker | 198/727 |
| 6,142,291 | * | 11/2000 | Schulze et al. | 198/727 |

FOREIGN PATENT DOCUMENTS

| | | | | |
|---|---|---|---|---|
| 451859 | * | 7/1975 | (RU) | 198/727 |

OTHER PUBLICATIONS

Cross–Section of Square–Bottom Drag Conveyor.

* cited by examiner

*Primary Examiner*—Joseph E. Valenza
(74) *Attorney, Agent, or Firm*—William Weigl

(57) ABSTRACT

A drag conveyor consists of a uniquely-configured trough and correspondingly-shaped outer edges of chain-driven paddles which enable the trough construction to provide physical support for a return of the chain. The cross-sectional shape of the trough further restricts the paddles from tending toward lifting above the trough bottom and climbing or twisting as they carry material toward the outlet end of the conveyor. The paddle shape results in a self-cleaning conveyor, even enabling handling of materials heretofore not feasible with conventional U-shaped trough conveyors. Elimination of obstructing idler sprockets and cross shafts of the prior art enables a productivity increase of as much as 15% for the same designated size of conveyor.

21 Claims, 3 Drawing Sheets

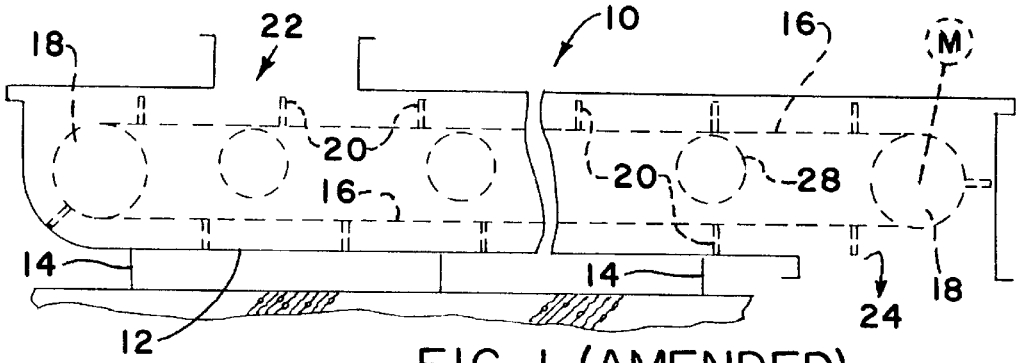
FIG. 1 (AMENDED)

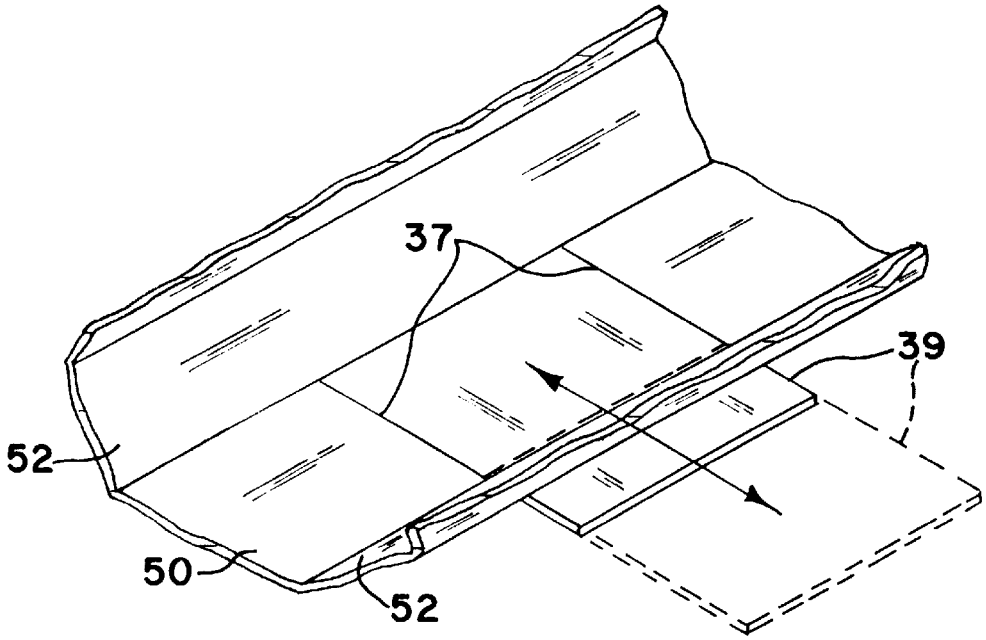
FIG. 10 (NEW)

DRAG CONVEYOR SYSTEM FOR PARTICULATE MATERIAL

Matter enclosed in heavy brackets [ ] appears in the original patent but forms no part of this reissue specification; matter printed in italics indicates the additions made by reissue.

This invention relates generally to chain conveyors for moving particulate or granular materials such as food grain, pelletized or paste-like dogfood, plastics, animal feeds, powders, flour, coffee beans, fertilizer and the like from one location to another in manufacturing processes such as bagging, mixing, blending and pelletizing, etc., and relates in particular to a drag conveyor system which includes a uniquely-configured trough, a continuous chain and chain-driven paddles of simpler, more effective and less costly construction and maintenance than heretofore.

BACKGROUND OF THE INVENTION

Drag conveyors of the general type disclosed herein have been known for a considerable period. Typically, such a conveyor comprises an elongated U-shaped trough having an inlet for material at one end and an outlet at the other, and sometimes, intermediate gatable outlets connected to various machines. The U-shaped bottom directs material toward the center, tending to make the unit self-cleaning. Such a capability is a requirement where product contamination is unacceptable upon changing from one product to another. After exiting from the outlet, the material is either processed or is directed by another conveyor to a further location. A link chain moves within the trough in a continuous, vertical plane and passes around a pair of sprockets on horizontal shafts, one of which sprockets is motor driven. Paddles which have their outer edges shaped to correspond to the bottom of the U-shaped trough are spaced equidistantly along the chain. The paddles are directed perpendicularly or radially outward of the chain so that in its lower run, the paddles drag the material along the trough from the inlet toward the outlet. The trough bottom thus frictionally supports the outer edges of the paddles and lower run of the chain against gravity, but support for the upper or return of the chain and its paddles has been another matter. The conveyor is typically between ten and two hundred fifty feet in length, making it necessary to provide support for the return run of chain to prevent sag and its undesirable consequences. Without chain or paddle support, the return paddles would interfere with product being fed in the opposite direction to the outlet. This required the provision of auxiliary structural elements for support of the chain at intervals along the return run. Chain sagging is unacceptable for a number of reasons. Chain tension is a system of this sort must be kept relatively high. The longer the conveyor and chain, the greater the chain's weight, thus requiring increased chain tension. Also, if the distance between the upper and lower chain runs is desired to be kept to a minimum to maintain a low conveyor profile, and if the return run support obstructs flow of material toward the outlet, contact of the material with the obstruction reduces the productive capacity of the conveyor. Such contact can cause the return paddles to move the uppermost portion of the material oppositely to the intended flow direction, and in some cases, even damage the material.

To prevent chain sag, the most common solution has been to provide idler sprockets for supporting the return run at spaced intervals between the upper and lower chain runs. Such idler sprockets require cross shafts for their support, and the shafts typically required either set collars or bearings in the side walls of the trough. The use of the idlers and their supporting elements is not only costly, but, because of the potentially abrasive nature of certain materials conveyed, they required frequent, time-consuming and costly maintenance, as well. Additionally, the cross shafts and idler sprockets of conventional drag conveyors presented the aforementioned obstruction to the flow of material, reducing the conveyor's productive capacity. Horizontal paddle-supporting rails have also been used in place of idler sprockets to support the paddles of the chain return run on some occasions, but they too are subject to initial cost and maintenance problems, not only of the rails and their supporting structure, but also from localized wear of the paddles themselves as the rails can tend to wear notches into the paddles.

A further problem with both of the two above-mentioned U-trough structures was the inability of the paddles under certain circumstances to remain in proper carrying contact with the bottom of the trough when performing dragging material toward the outlet. They had a tendency to lift tip off the bottom in instances where the product has a high moisture content, e.g., 25% or more. The paddles were also prone to twisting and skewing about the chain during abnormal side thrust, such as an unintended infeed of material from only one side of the inlet. To combat the lifting and twisting, some users, mainly those who had no concern about product contamination, have been known to bolt angle iron holddown rails to the insides of the carrying trough immediately above the inner edges of the paddles. However, the solution to the lifting or twisting problems created additional problems of somewhat impeding material flow (and attendant reduced capacity), undesirable retention of product standing on ledges created by the angle iron rails and degradation of and damage to certain products such as popcorn kernels and industrial particles intended to be kept intact at delivery. It is believed that this version was used primarily where self-cleaning at the end of a run was not essential or where product degradation was of little concern.

One other type of drag conveyor finding restricted use had a flat bottom and vertical side walls. The rectangular paddles improved capacity, but the design had other problems, such as lifting above the bottom, skewing and the inability to self-clean at the end of a run. Product often remained at the outside corners of the trough, essentially limiting the conveyor to use in situations where self-cleaning was not a requirement. The lifting problem was solvable by using rails, but that, brought on other problems noted above.

SUMMARY OF THE INVENTION

A drag conveyor consists of a uniquely-configured trough and correspondingly-shaped outer peripheries and inner edges of chain driven paddles to enable the trough construction itself to provide physical support for the paddles along both the material conveying and return runs of the chain. The cross-sectional shape of the trough further restricts the paddles from tending toward lifting above the trough bottom and climbing or twisting as they carry material toward the outlet end of the conveyor. Additionally, as wear of the supporting edges of the return paddles ensues, they broaden their contacting surfaces, providing greater support for the return run of the chain. The paddle and trough space results in a self-cleaning conveyor, even enabling handling of materials heretofore not feasible with conventional U-shaped trough conveyors. Elimination of obstructing idler sprockets, cross shafts and holddown rails of the prior art enables a productivity increase of as much as 15% for the same designated size of conveyor.

A principal object of the invention is to provide an effective and efficient self-cleaning drag conveyor with increased productive capacity, one which is simpler in construction, less costly to manufacture, easier to fabricate, and less costly and time-consuming to maintain than comparable conventional conveyors.

A more specific object is to provide a unique cross-sectional configuration of drag conveyor trough arid paddles which enable accomplishment of the foregoing objective.

A further object of the invention is to provide a conveyor having an increased capacity for the same size trough, the increase being essentially the result of eliminating the obstruction posed by idler sprockets, cross shafts arid hold-down rails of the prior art.

Another object is to provide a drag conveyor system which eliminates the possibility of lifting, twisting or turning of carrying paddles along the lower carrying run of the chain without necessitating use of auxiliary structure in the trough.

Another object is to provide a drag conveyor which enables handling of high-moisture content sticky or pasty particulate materials found very difficult or impossible to convey by means of conventional conveyors, and to do so in a self-cleaning manner at the end of a run.

Still another is to provide a system which increases the chain-supporting bearing surface areas of paddles in the return run as wear ensues.

A further object is to provide a self-cleaning flat-bottomed conveyor which enables side-operated gating mechanism to be used at intermediate outlets.

Other objects and advantages will become apparent from the following description, in which reference is made to the accompanying drawings.

DESCRIPTION OF THE DRAWINGS

FIG. 1 is a simplified, schematic side elevational view of a typical drag conveyor of the prior art.

*FIG. 10 is a simplified isometric view of an intermediate gated outlet for enabling material to be fed from the conveyor to a separate processing machine.*

DESCRIPTION OF THE PREFERRED EMBODIMENT

Figure 2:
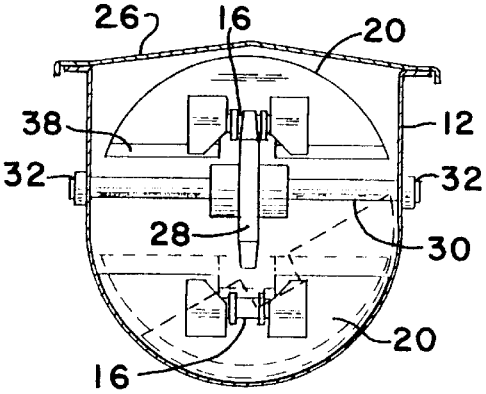
FIG. 2 PRIOR ART
FIG. 2 is a vertical cross-sectional view of one most common type of prior art conveyor, illustrating in dotted lines one problem inherent in its design.

For an understanding of the general environment in which the invention is employed, a drag conveyor 10 is shown as comprising a trough 12 supported above a floor on legs 14, a continuous chain 16 supported on the teeth of a pair of sprockets 18 and a plurality of paddles 20 which extend perpendicularly outwardly from the chain. The conveyor illustrated and to be described is horizontal, but is should be understood that it may also be inclined. The paddles are typically located at intervals along the chain some twenty inches or so apart, for example. This is depicted simply and schematically in FIG. 1, where a particulate or granular material is introduced into an inlet 22 and is dragged to the right by the paddles 20 along the bottom of the trough 12 until the material reaches a discharge point designated by an outlet 24. The inlet has a conventional overhead feed divider (not shown) which splits the flow of material to opposite sides of the chain to avoid side loading thrust. Although not essential to split incoming flow when using my invention, it was essential for conventional U-shaped trough conveyors and is being maintained here for convenience. As will be seen later, because of the subsequently-described technique of restraining the chain and paddles from twisting within my novel through, side thrust from infed material is no longer a problem. The sprocket 18 at the right end of FIG. 1 is typically a motor driven drive sprocket for pulling the lower run of the chain from the inlet 22 toward the outlet 24 (or to intermediate outlets, not shown), thus the designation "drag" conveyor in this art. The lower run of the chain 16 runs rightwardly, and the upper or return of the chain travels to the left and passes around an idler or tail sprocket at the left end, as shown in FIG. 1. The feed or material into and from the trough is not described, since the conveying system can be associated with any of a variety of different kinds of incoming and delivering or processing equipment, including grain elevator infeed and delivery directly to a bagging machine, for example.

Figure 3:
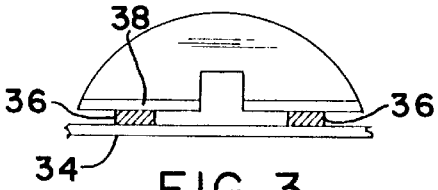
FIG. 3 PRIOR ART
FIG. 3 is a fragmentary vertical cross-sectional view of a portion of another type of prior art conveyor.

FIGS. 2 and 3 illustrate two common types of paddle and trough systems which have been employed in this field for a very long period of time. In FIG. 2, the trough 12 has a cross-sectional shape in the form of a deep U and has a cover or lid 26 which normally covers the conveyor during operation. The paddles 20 can be connected by any of several different methods to the chain 16, for example, by welding brackets to opposite chain links and then bolting the brackets to the paddles. The PRIOR ART paddles of FIGS. 2 and 3 are shown to have rounded or circular outer peripheral edges to mate with the U bottom of the trough 12.

Conveyors of this type are usually produced in ten foot lengths and connected end-to-end for the overall length required. While this presents no problem of chain sag for the lower run of the chain because the outer edges of the paddles 20 ride on the U-shaped bottom, the problem of supporting the return or upper run of the chain has been of significant consequence. The chain 16 is normally kept under fairly high tension. It includes a motor drive and power interrupt system (not shown) which is responsive to chain breakage. The tensioning, drive and interrupt systems are well known in the art, and will not be described in detail. To eliminate the potential for chain sag, the trough was provided at intervals of every thirty inches or so along its length with an idler sprocket 28 journaled on a cross shaft 30. The shaft 30 extended through the vertical side walls of the trough 12 and had set collars 32 at the exterior to fasten the shaft in place. Alternatively, in place of the collars 32, bearings could be used to allow shaft 30 to rotate, and the idler sprocket was then pinned to the shaft. Such construction has been the industry standard for drag conveyors for a considerable period. It has, however, also presented a major problem not only from the manufacturing and cost standpoint at the outset, but also from the maintenance standpoint of replacement of the sprockets and shafts. As will be seen, my invention totally eliminates the need for the sprockets and shafts, as well as the cost of their production, installation and maintenance. The idlers and sprockets of the prior art were also a limiting factor in the capacity of the conveyor.

Typically, paddles are fully capable of moving a stream of material having an upper limit well above their upper edges. But, because of the physical obstruction posed by the plurality of sprockets 28 and shafts 30, the infeed flow had to be maintained so as to keep the upper level of the stream below the shafts 30 and the hubs of the sprockets. In essence, were it not for the shafts 30 and sprockets 28, the unit of FIG. 2 could maintain the material flow with its upper edge just below return paddles. A further problem with the U-shaped trough of FIG. 2 is that side thrust on the chain could cause the paddles to ride up the trough as shown in dotted lines. This twisting had the potential of "snow-plowing" of one corner of the paddles against the cross shafts 30, frequently resulting in chain breakage due to its being contorted. Oftentimes, however, increased chain tension would cause machine interrupt controls to trip the motor and stop the chain drive until the problem could be corrected. But where performing at a high rate, down time of the production equipment to which the material is being fed can be costly to the manufacturer.

It is known to bolt angle iron holddowns (not shown) in the trough to prevent twisting and lifting of the paddles as mention in the Background. While solving those problems, however, new ones were introduced. The rails tended to somewhat reduce the capacity of the conveyor, occasionally damaged grains which were intended to be kept whole, but most importantly, eliminated the self-cleaning capability which is essential for many drug conveyors. For certain uses, however, such as where the same material is fed all the time, or where product contamination from one product to the next is of no concern, this is an acceptable design trade-off.

Another and different type of support system for the return run of chain is depicted in fragmentary fashion in FIG. 3. It to was used in a U-shaped trough environment and theoretically, its capacity was greater than the FIG. 2 version, since it had little in the way of obstructing elements inhibiting material flow. Its use was not as widespread as the FIG. 2 version, however, because if was subjected to even greater problems. In place of the sprockets 28 and shafts 30, cross bars 34 were made to support a pair of rails 36 on which the inner edges of the paddles 20 rode in frictional contact. As wear would ensue through prolonges usage, the rails could tend to wear notches into the inner edges. Paddles of this type are typically beveled at their inner edges as at 38 on the material driving side, so that contaminating "soldiers" (i.e., pieces of the granular material from a completed job) could not stand on the inner edges when changing to convey a different material. In effect, then, the pointed inner edges at the bevel (with very little surface area) made contact with the rails 36 in the FIG. 3 construction. Although this variation eliminated the more costly sprocket and shaft construction of FIG. 2, it had other problems also and has been less of a factor in the industry. Being used in a U-shaped trough environment, the potential for chain twisting was always present. With the designs of FIGS. 2 and 3, there was nothing (short of the holddown rails mentioned earlier) restraining the paddles from lifting and twisting in the lower run as a result of either undesired side thrust caused at the inlet 22 or high moisture content of the product, as noted previously.

Long conveyors may have one or more intermediate gated outlets *37* in advance of outlet 24 so as to enable the drag conveyor to feed any one of several processing machines which are usually positioned at right angles to the conveyor 10. Where the through is U-shaped, the gate only [only] be moved lengthwise of its conveyor, and *in such case* its upper surface cannot be made to conform to or be coplanar with the bottom of the trough. This makes self-cleaning, i.e., completely removing all granular material from the conveyor at the end of a run, impossible. *A U-shaped trough can be made essentially self-cleaning when it has an intermediate gate which opens and closes by circular movement crosswise of the trough as shown in U.S. Pat. No. 5,174,433.* As is known in this art, where the trough has a flat bottom, the gate may be a flat plate *such as 39 in FIG. 10,* movable at a right angle to the conveyor. This enables the upper surface of the plate *39* to be kept flush or coplanar with the flat bottom *50* of the conveyor when the gate is closed. A flush surface permits the self-cleaning to take place by simply stopping the inflow of material at the inlet 22 and letting the chain run long enough to drag the last bit of material from the trough. All surfaces of the conveyor are designed to allow gravity feed of material to the bottom of the trough to achieve the desired self-cleaning.

Figure 4:
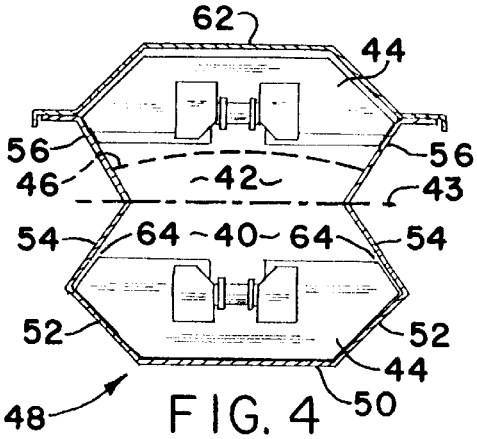
FIG. 4 is a vertical cross-sectional view of the preferred form of improved conveyor of the present invention.
Figure 5:
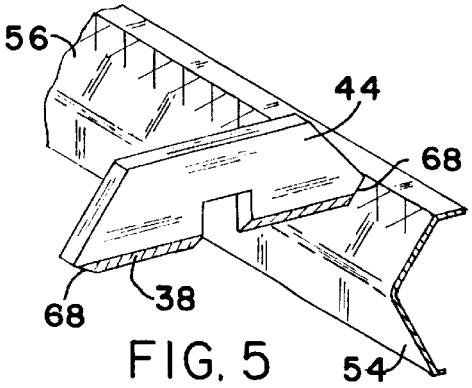
FIG. 5 is an isometric view of a paddle and the return run chain-supporting bearing surface contacted by paddles.

FIGS. 4 and 5 show the improvement of my invention in cross-sectional configuration for a direct comparison to the PRIOR ART versions of FIGS. 2 and 3. This view, like those of FIGS. 2 and 3, is taken with the upper return paddles coming toward the viewer and the lower, carrying paddles moving away from the viewer when looking from the left of FIG. 1. The trough consists of a lower material-carrying section 40 and an upper return section 42 which is a mirror image of the lower section 40 in the preferred form of the invention. For descriptive purposes, the sections 40 and 42 can be said to be mirror-imaged at an imaginary parting line 43. The two cross sections can be described for convenience of understanding as a stacked pair of vertically-compressed hexagons, with the lower section 40 encompassing the lower run of the chain and carrying paddles 44 and the upper section 42 supporting the return run of the chain and its return paddles 44. The paddles 44 are designated "carrying paddles" when functioning in the lower section 40, and "return paddles" when in the upper section 42. Material may fill the trough as high as the dotted line 46 in FIG. 4 for the full length of the trough, just below the return paddles.

The section 40 and the lower half of section 42 can be constructed on a standard press brake from a single metal sheet of appropriate gauge. These sections can also be made of three elongated elements for designs in which a plastic or steel liner is to be used in the bottom of the trough, so that the liner can be secured in the bottom. Whether or not a liner is used, the hexagonal shape of the section 40 is essentially made up of an elongated trough 48 having a bottom wall 50, a pair of outwardly and upwardly angled side walls 52 and a pair of inwardly and upwardly directed side walls 54. The section 42 commences at the upper edges of side walls 54 and parting line 43, and includes upwardly and outwardly extending side walls 56. Although sections 40 and 42 are shown to be mirror imaged, as will be seen later in FIG. 8, they need not be. At the junctures where side walls 52 and 54 meet, the walls may be provided with horizontally-outward flanges to enable the section 40 to be separated for installation of the conventional liner mentioned previously. The liner would cover bottom wall 50 and side walls 52, and its outer edges would be held in place between the flanges, which would be bolted together. Liner lengths were made to abut in end-to-end fashion. At this feature has no direct bearing on the subject matter claimed, it has not been shown.

The carrying paddles 44 are in the nature of truncated, flattened hexagons, with their bottom outer peripheral edges resting against the bottom wall 50 and adjacent angled edges contacting the side walls 52 while dragging material along the trough. The walls 52 diverge outwardly from the bottom wall 50 at the same angle as the angled edges of the carrying paddles. A small clearance, about ¼ to ⅜ths of an inch is provided at 64. Should there be any tendency of the carrying paddles to lift or twist about the lower chain run, it would be immediately resisted by contact of the paddles and wall at the small clearance area 64. The inner surfaces of side walls 52 and 56 slope toward the bottom wall 50, tending to feed all material to the bottom wall or liner by gravity, thus enabling self-cleaning of the conveyor to take place at the end of a run.

Since the conventional idler sprockets 28 or auxiliary rails 36 such as those shown in FIGS. 2 and 3 have been eliminated from the FIG. 4 structure, I utilize the side walls 56 as bearing surfaces for supporting opposing corresponding inner angles edges 68 of the return paddles. I thus utilize the return paddles themselves as the supporting medium for the upper run of the chain. The paddles may be about ⅝ths inch in thickness and thus provides a good contact surface with the bearing surface of side walls 56 as shown shaded in FIG. 5. Should wear of the contacting edges of the return paddles with side walls 56 occur after time, the contacting surface area will increase.

Other design variations are feasible while still retaining several key aspects of my invention, namely, the utilization of the outer edges of the paddles for support in the lower section 40 and of their inner edges for support in the return section 42, the gravitational directing of material toward the bottom of the trough to assure self-cleaning upon job completion, and restraint of any tendency of the chain and paddles to twist while running in the lower section 40.

Figure 6:
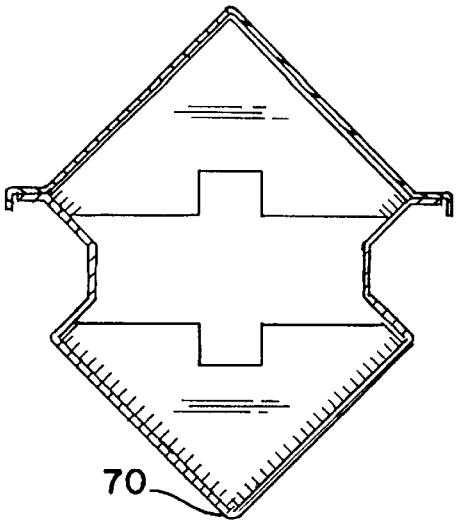
FIG. 6–9 illustrate simplified vertical cross-sectional views of four alternative forms of the invention, all of which incorporate key aspects of the improvement of my invention.
Figure 7:
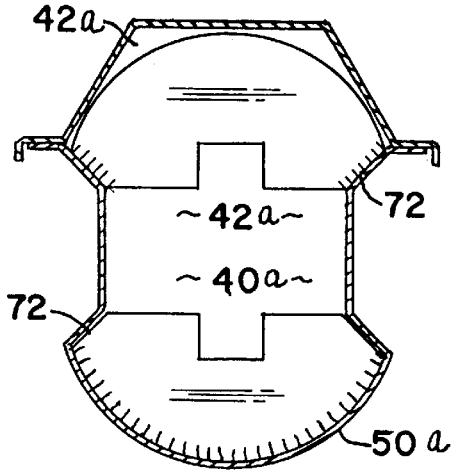
Figure 8:
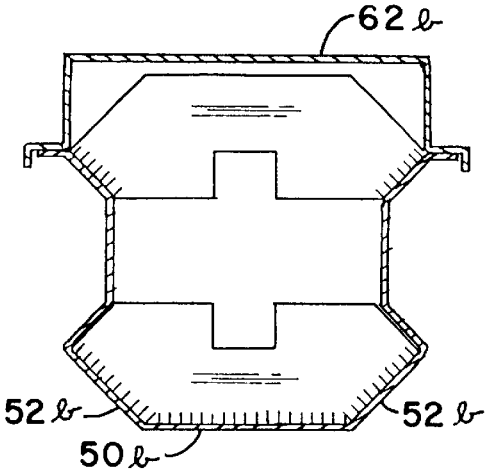
Figure 9:
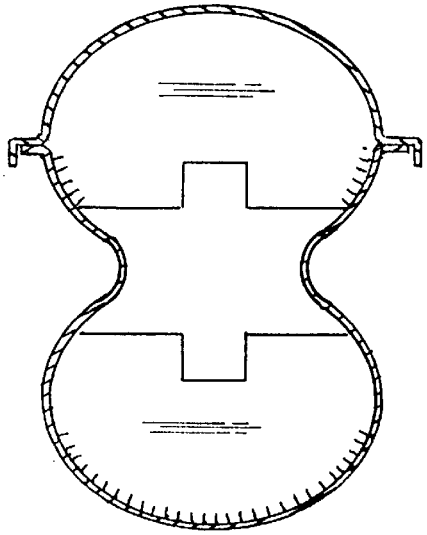

FIG. 6 illustrates a paddle and trough configuration which eliminates the flat bottom wall 50 of FIG. 4, but runs some risk of incomplete cleanout of materials at point 70, especially if the material being handled is very fine. This figure, as well as FIGS. 7–9 shows short crosshatch-type markings to illustrate bearing surfaces of the paddles against their respective tipper and lower sections of the trough. The lack of a flat bottom wall also presents difficulties in gating of an intermediate outlet in the lower section, but is suitable for use where no intermediate gating is necessary, FIG. 7 uses rounded outer edges for the paddles like those of the prior art, but cuts off the corners of the paddles at 72 to provide the dual functions of supporting the return paddles in the upper section 42*a* as well as restraining any tendency of the carrying paddles and chain to twist while in the lower section 40. Also, the rounded trough is more difficult and costly to produce, but could be acceptable under certain circumstances.

FIG. 8 illustrates a differently-shaped mid-section of a trough than that of FIG. 2, indicating that a mirror-imaged device, while preferred, is not essential to accomplish the primary objectives of the invention. Nor does the cover 62*b* need to be a mirror image of the bottom wall 50*b* and side walls 52*b,* as cover 62 in FIG. 4.

FIG. 9 illustrates a variation of the invention which is necessarily more costly to form, but is still capable of providing the primary advantageous features of my invention.

The paddles are preferably made of ultra-high molecular weight nylon, polyethylene, polyurethane or similar material well understood for such usage in this art. Such materials tend toward minimal resistance to frictional forces and thus have relatively long lives.

The necessity of providing the more costly, accurately-rounded U-shaped trough of the prior art may be eliminated. The trough elements of the preferred form of my invention can be easily produced by being accurately bent on a standard brake press.

Various other changes may be made in the design based upon the foregoing description without departing from the spirit and scope of the claims.

Having described my invention, I claim:

1. In a drag conveyor system for moving particulate material from an inlet an one location to an outlet at a remote location; said conveyor comprising an elongated continuous link chain movable in a vertical plane about a drive sprocket at one end adjacent one of said locations and a tail sprocket adjacent the other of said locations, motor means for driving said drive sprocket, a trough having a bottom, opposed sides, an open top and a cover for said open top, said trough encompassing said chain throughout its length, a plurality of material-carrying paddles spaced longitudinally about said chain and extending radially outward therefrom; said paddles having their outermost edges corresponding in shaped and size to the bottom of said trough to drag material introduced into said trough at said inlet toward and to said outlet, the improvement comprising:

said trough having:

a). a cross-sectional configuration including a lower material-carrying section preferably encompassing a lower run of said chain and portions of inner edges of said paddles along said lower run, said inner edges and lower section restraining said paddles and chain against rotational twisting movement relative to said trough;

b). an upper return run section immediately above said lower section and encompassing the upper run of said continuous chain, said upper section having portions thereof directed inwardly of the sides of said trough for edgewise supporting of the inner edges of the paddles in their passage through said return run section from said outlet to said inlet; and said paddles being relatively flat in a direction normal to said chain and having peripheral edges corresponding to the configuration of said lower section, whereby outer edges of material-carrying paddles moving along said lower run section side frictionally against the bottom and adjacent side edges of said trough when carrying material toward side outlet and wherein inner edges of said paddles moving along said return run section ride frictionally and are solely supported by the inwardly-directed sides of said upper section to support the chain in said return run section.

2. The invention according to claim 1 wherein said inwardly-directed sides also restrain said paddles and chain against twisting when situated within said lower section.

3. The invention according to claim 2 wherein said inwardly-directed sides form sidewise-lying V's with their apexes facing each other, said apexes lying on an imaginary parting line between mirror-images upper and lower sections.

4. The invention according to claim 3 wherein that portion of the inwardly-directed sides above the parting line provides support for the inner edges of the paddles in said return run section and that portion of the sides below the parting line are closely spaced relative to the inner edges of the paddles when in said lower section, whereby to restrain the chain against any tendency to twist.

5. The invention according to claim 1 wherein said paddles and each of said lower and upper sections is essentially the cross-sectional shape of a vertically-compressed hexagon.

6. The invention according to claim 5 wherein the bottom of said trough if flat and has outwardly and upwardly diverging sides terminating at a point and then converging upwardly and inwardly to form five sides of said hexagon shape, and wherein said upper section comprises outwardly and upwardly diverging sides forming the portion of said trough which supports the outer edges of said paddles in said return run section, the diverging sides of said upper section being angled to enable particulate material to descend by gravity to the bottom of the trough upon completion of a run of said material.

7. The invention according to claim 6 wherein the trough terminates at the upper edges of the sides of said upper section, and wherein the remaining three sides of the hexagon shape of said upper section are formed by a removable cover having a relatively flat top and outwardly and downwardly-diverging sides corresponding generally in shape and size to the bottom three sides of said trough.

8. The invention according to claim 1 wherein said trough bottom is V-shaped.

9. The invention according to claim 1 wherein said trough bottom is circular.

10. The invention according to claim 1 wherein said trough bottom is oval.

11. The invention according to claim 1 wherein the sides of said trough intermediate said upper and lower sections are symmetrical.

12. The invention according to claim 1 wherein the sides of said trough intermediate said upper and lower sections are asymmetrical.

*13. In a drag conveyor system for moving particulate material from an inlet at one location to an outlet at a remote location: said conveyor system comprising an elongated endless link chain having upper and lower runs movable in a vertical plane about a drive sprocket at one end of said locations and a tail sprocket adjacent the other of said locations, motor means for driving said drive sprocket, an elongated trough having a bottom, opposed sides, an open top and a cover for said open top, said trough encompassing said chain throughout its length, a plurality of material-carrying paddles spaced longitudinally about said chain and extending laterally and radially outward therefrom; said paddles having their radially outer edges corresponding in shape and size to the bottom of said trough to drag material introduced into said trough at said inlet toward and to said outlet, said trough having:*

*a lower material-carrying section encompassing the lower run of said chain and paddles moving along said lower run; an upper return run section immediately above said lower section and encompassing the upper run of said chain and paddles, said upper section having elongated bearing surface portions thereof directed downwardly and inwardly from opposite sides of said trough for edgewise frictional supporting of inner laterally outward edges of the paddles in their passage through said return run section from said outlet to said inlet; and*

*said paddles being relatively flat and having a thickness in a direction normal to said chain and further having outer edges which ride frictionally against the trough bottom when carrying material toward said outlet in said lower material-carrying section, and said paddles further having opposed laterally outward inner edges inclined at the same angle as said bearing surface portions for riding frictionally on and providing the sole support for the chain and paddles on the inwardly-directed bearing surface portions of said upper section while travelling through said upper return run section, said angled inner edges of the paddles providing a substantial bearing surface of said paddles against the bearing surface portions.*

*14. The invention according to claim 13 wherein the inner surfaces of the opposed sides adjacent the trough bottom slope downwardly at an angle toward the trough bottom and tend to feed all material toward the bottom by gravity, and wherein said paddle outer edges correspond to said bottom and the adjacent inner sloping sides of said opposed surfaces, thereby enabling self-cleaning of the trough bottom at the end of a run.*

*15. The invention according to claim 13 wherein the trough bottom is flat and lies in a horizontal plane, wherein a gated outlet is provided intermediate said inlet and said outlet to enable material being conveyed to be discharged from the trough in advance of said outlet, and wherein a gate comprising a flat plate having an upper surface coplanar with the flat bottom of the conveyor system is movable at a right angle to said conveyor system to enable opening and closing of said gated outlet.*

*16. The invention according to claim 15 wherein said opposed side inner surfaces are flat and lie in intersecting planes each of which is inclined downwardly toward a juncture at said flat bottom.*

*17. The invention according to claim 13 wherein each said paddle is in the range of approximately ⅝ths of an inch in thickness, and wherein the inner edge of each paddle intermediate the laterally outward portions thereof extends horizontally and is beveled relative to the vertical plane at an angle to the horizontal in order to inhibit particulate material from collecting atop said intermediate inner edge while the paddles are passing through said lower material-carrying section.*

*18. The invention according to claim 13 wherein each of said paddles and each of said upper and lower sections are essentially the cross-sectional shape of a vertically-compressed hexagon having a flat top, a flat bottom and diagonal sides interconnecting the flat top and flat bottom, with the flat bottom and laterally outer edges of said paddles frictionally engaging the trough bottom and adjacent portions of said opposed side walls of said trough in said lower section and the diagonal laterally outward inner edges of said paddles frictionally engaging said bearing surface portions in said upper return run section.*

*19. The invention according to claim 18 wherein said lower material-carrying section closely corresponds in size and shape to said vertically-compressed hexagonal paddles, whereby to restrain said paddles and chain against rotational twisting movement relative to said trough while conveying material through said lower section.*

*20. The invention according to claim 1 wherein the trough bottom is flat and lies in a horizontal plane, wherein a gated outlet is provided intermediate said inlet and said outlet to enable material being conveyed to be discharged from the trough in advance of said outlet, and wherein a gate comprising a flat plate having an upper surface coplanar with the flat bottom of the conveyor system is movable at a right angle to said conveyor system to enable opening and closing of said gated outlet.*

*21. The invention according to claim 20 wherein each said paddle is approximately ⅝ths of an inch in thickness, and wherein the inner edge of each paddle intermediate the laterally outward portions thereof extends horizontally and is beveled relative to the vertical plane at an angle to the horizontal in order to inhibit particulate material from collecting atop said intermediate inner edge while the paddles are passing through said lower material-carrying section.*

* * * * *